(12) United States Patent
Tseng et al.

(10) Patent No.: US 10,949,483 B2
(45) Date of Patent: Mar. 16, 2021

(54) LOCATION TAGGING FOR UBIQUITOUS ACCESS

(71) Applicant: FORD GLOBAL TECHNOLOGIES, LLC, Dearborn, MI (US)

(72) Inventors: Fling Tseng, Ann Arbor, MI (US); Johannes Geir Kristinsson, Ann Arbor, MI (US); Jessamyn Smallenburg, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 16/186,685

(22) Filed: Nov. 12, 2018

(65) Prior Publication Data

US 2020/0151264 A1    May 14, 2020

(51) Int. Cl.
*G06F 16/00* (2019.01)
*G06F 16/9537* (2019.01)
*G06F 16/29* (2019.01)
*G06F 16/248* (2019.01)
*G06F 16/9535* (2019.01)
*G06F 16/2457* (2019.01)

(52) U.S. Cl.
CPC ........ *G06F 16/9537* (2019.01); *G06F 16/248* (2019.01); *G06F 16/24578* (2019.01); *G06F 16/29* (2019.01); *G06F 16/9535* (2019.01)

(58) Field of Classification Search
CPC ............. G06F 16/9537; G06F 16/9535; G06F 16/248; G06F 16/29
See application file for complete search history.

(56) References Cited

U.S. PATENT DOCUMENTS

| | | | |
|---|---|---|---|
| 8,170,960 B1 * | 5/2012 | Bill .................... | G01C 21/3617 706/11 |
| 2001/0053956 A1 * | 12/2001 | Ohishi .................. | G01C 21/36 701/425 |
| 2009/0030685 A1 * | 1/2009 | Cerra .................... | G10L 15/183 704/236 |
| 2011/0173150 A1 | 7/2011 | Van Zwol et al. | |
| 2017/0249504 A1 | 8/2017 | Martinson et al. | |
| 2018/0017405 A1 * | 1/2018 | Chen ...................... | H04W 4/40 |
| 2018/0195875 A1 * | 7/2018 | Yang .................. | G01C 21/3611 |

* cited by examiner

*Primary Examiner* — Khanh B Pham
(74) *Attorney, Agent, or Firm* — Michael Spenner; Brooks Kushman PC

(57) ABSTRACT

A vehicle includes a controller programmed to identify tag phrases for locations that express a relationship between the location and a learned location tag. The tag phrases are based on words and word sequences learned from prior selections and inputs of a user. The controller is programmed to communicate the tag phrases to the user and provide trip assistance based on a selected tag phrase chosen by the user. The locations and tag phrases are accessible to devices such that locations are identified with common tag phrases on each of the devices.

18 Claims, 6 Drawing Sheets

Complete Distribution Profile P(X,Y)

LOCATION TAGGING FOR UBIQUITOUS ACCESS

TECHNICAL FIELD

This application generally relates to systems and methods for identifying locations with tags.

BACKGROUND

Many vehicles include a system that provides directions and route guidance to vehicle operators. The system may be configured to display a current position on a map. The systems allow entry of addresses to set destinations. Address entry often requires knowledge of street number, street name, and city name. In many cases, the vehicle operator may not have specific knowledge of addresses of desired destinations.

SUMMARY

A vehicle includes a controller programmed to generate one or more tag phrases that express a relationship between a destination and a learned location tag and are based on words and word sequences learned from prior selections and inputs of a user, communicate the tag phrases to the user, and provide trip assistance based on a selected tag phrase chosen by the user.

The learned location tag may be a label associated with a previously learned and identified location. The tag phrases may express a relative positional relationship between a location associated with the destination and a location associated with the learned location tag. The inputs of the user may include voice inputs that are converted to a sequence of words and the controller may be further programmed to generate the tag phrases for the destination such that the tag phrases have a greater probability of including words and word sequences used in the voice inputs. The tag phrases may include one or more of a preposition, a label, a name of a person, the learned location tag, an activity type, a symbol, and relevant location tags that collectively describe the destination according to learned preferences of the user. The controller may be further programmed to order the tag phrases for display based on relative frequencies of words and word sequences included in previously-selected tag phrases such that tag phrases including words and word sequences having greater relative frequency are displayed earlier. The controller may be further programmed to maintain the destination and tag phrases in a remote database that is accessible via a network by applications executed on other devices associated with the user such that the applications identify the destination with the tag phrases generated by the controller. The controller may be further programmed to receive tagging data aggregated from other users and to generate the tag phrases based on the tagging data. The controller may be further programmed to communicate the tag phrases via a display.

A method includes identifying a location with a plurality of tag phrases that express a relationship between the location and a base location tag. The method further includes learning the tag phrases according to relative frequencies of words and word sequences from prior selections and inputs of a user. The method further includes communicating the tag phrases to the user and receiving input from the user to select one of the tag phrases.

The method may further include converting voice inputs into a sequence of words and ordering the tag phrases for the location such that such that the tag phrases have a greater probability of including words and word sequences used in the voice inputs. The method may further include maintaining the tag phrases in a database that is accessible via a network. The method may further include accessing the database from applications executed on more than one device and presenting location information in the applications using the tag phrases from the database such that the location is identified with the same tag phrases in each of the applications. The method may further include receiving tag data from a server connected to the network and constructing at least one of the tag phrases according to the tag data. The method may further include ordering the tag phrases for communication to the user by assigning a higher priority to tag phrases that include words and word sequences having a greater relative frequency of occurrence in prior selections and user inputs. The method may further include ordering the tag phrases for communication to the user by assigning a lower priority to tag phrases that have been communicated to the user but not selected by the user.

A system includes a database, a first controller programmed to identify locations with tag phrases expressing a relationship between the locations and a base location tag and learned according to words and word sequences learned from prior selections and inputs of a user and store location and associated tag phrases in the database, and a second controller having access to the database and programmed to identify locations using the tag phrases from the database.

The second controller may be further programmed to learn tag phrases for locations according to a composition of existing tag phrases using words and word sequences learned from prior selections and inputs of a user and store the locations and associated tag phrases in the database. The tag phrases may include one or more of a preposition, a symbol associated with the locations, a category label associated with the locations, a name of a person associated with the locations or the base location tag, and a proper name associated with the locations. The second controller may be programmed to execute a plurality of applications and the applications may be programmed to identify a location using the tag phrases from the database such that each of the applications identifies the location with a same tag phrase.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A navigation and trip assistance system is disclosed herein that improves the expression of locations and predicted destinations to users. Locations may be expressed as phrases that mirror how the user typically expresses locations. Locations may be expressed as being relative to known or frequently visited locations. The system provides a more natural way of presenting and inputting locations and destinations and more naturally reflects how a user refers to locations. An additional benefit of the system is that the phrases are available across devices and applications associated with the user. This allows the same phrases to describe locations on any device such as vehicles, phones, tablets, and computers. Learning of phrases associated with the locations may take place on all devices which may improve the rate of learning. The system also provides an interface that facilitates manual tagging of locations by the user.

Figure 1:
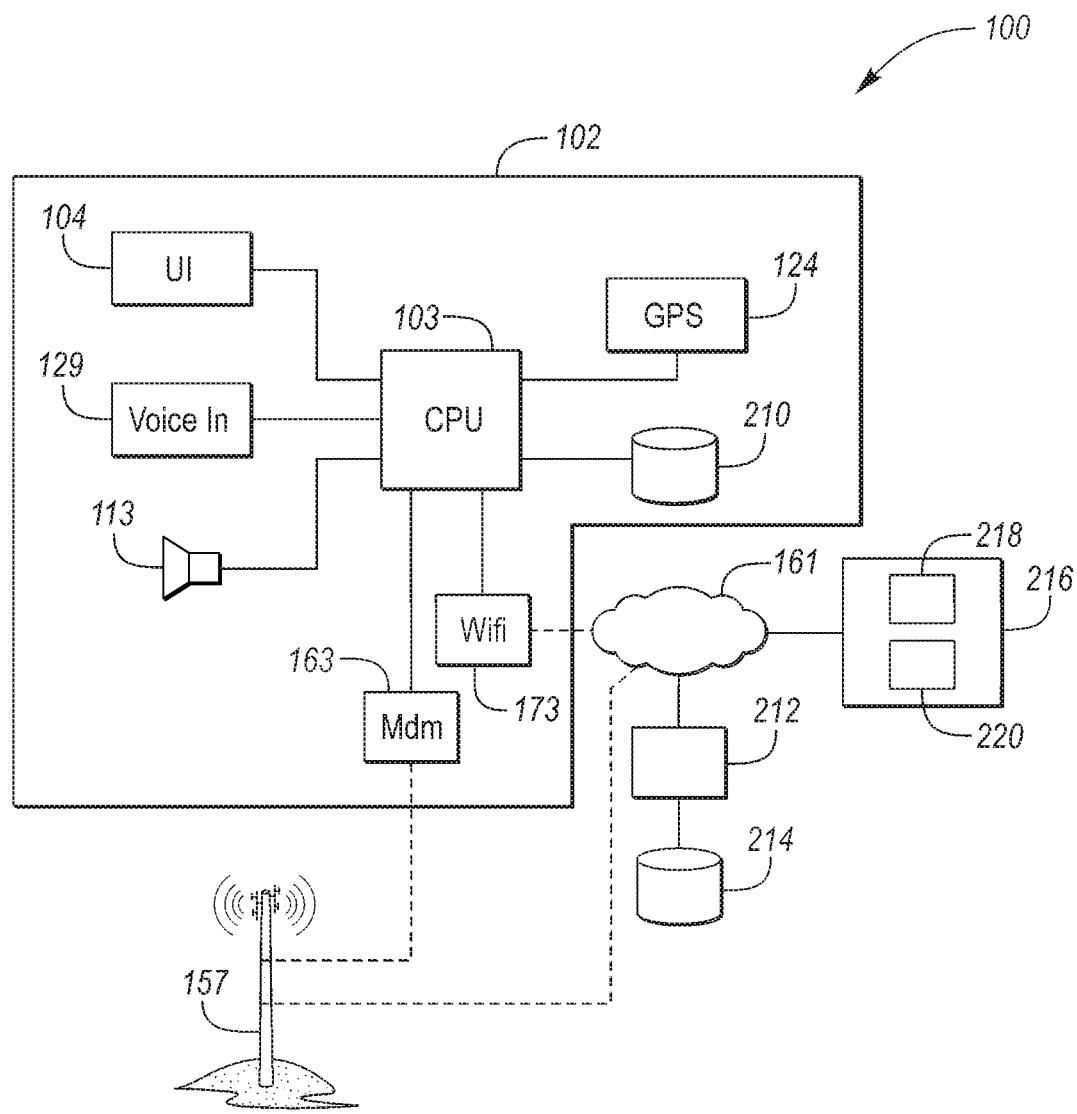
FIG. 1 is a possible configuration of a vehicle including a trip assistance system.

FIG. 1 depicts a possible arrangement of components for a vehicle navigation and trip assistance system 100. The system 100 may be implemented in part by components in a vehicle 102. The vehicle 102 may include at least one vehicle controller 103. The vehicle controller 103 may control at least some portion of the operation of the system 100. The vehicle controller 103 may be configured to permit onboard processing of commands and routines. The vehicle controller 103 may include both non-persistent and persistent storage elements. For example, the non-persistent storage may include random access memory (RAM) and the persistent storage may include flash memory. Non-transitory memory may include both persistent memory and RAM. In general, persistent storage may include all forms of memory that maintain data when a computer or other device is powered down. These include, but are not limited to, hard disk drives (HDD), compact discs (CD), digital video disc (DVD), magnetic tapes, solid state drives, portable Universal Serial Bus (USB) drives and any other suitable form of persistent memory. Note that the functions described herein may also be implemented in separate controllers that are in communication with each other.

The vehicle 102 may include a global positioning system (GPS) device 124. The GPS device 124 may be configured to receive signals from GPS satellites and generate position coordinates corresponding to the present location of the vehicle 102. The vehicle controller 103 may include one or more interfaces to communicate with the GPS device 124.

The vehicle 102 may include a user interface 104. The user interface 104 may include a display unit such as a Liquid Crystal Display (LCD). Further, the display unit may be a touchscreen display that is configured to provide input based on a touch position on a display screen. The vehicle controller 103 may include a display module interface to permit the display of graphic elements on the screen and to receive input from the screen. The user interface 104 may further include switches and/or buttons to provide inputs to the vehicle controller 103. For example, in some configurations, buttons may be placed adjacent the screen to allow selection of input items displayed in an adjacent position on the screen. In some configurations, some of the switches and/or buttons may be located on a steering wheel.

The vehicle controller 103 may include an interface to receive audio input from a voice input system 129 (e.g., microphone) and to provide audio output to one or more speakers 113. Although not shown, numerous of the vehicle components and auxiliary components in communication with the vehicle controller 103 may use a vehicle network (such as, but not limited to, a Controller Area Network (CAN) bus, a Local Interconnect Network (LIN) bus, a Media Oriented System Transport (MOST) bus, an Ethernet bus, or a FlexRay bus) to pass data to and from the vehicle controller 103 (or components thereof).

The vehicle 102 may include an onboard modem 163 having an antenna for establishing a vehicle-tower communication path directly with a cellular communications tower 157 for communicating with a network 161. As a non-limiting example, modem 163 may be a USB cellular modem and vehicle-tower communication path may be cellular communication. The vehicle controller 103 may implement an operating system including an application programming interface (API) to communicate with modem application software. Data may be communicated between the vehicle controller 103 and the network 161 utilizing, for example, a data-plan, data over voice, or Dual Tone Multi Frequency (DTMF) tones associated with the onboard modem 163. In the data-over-voice configuration, a technique known as frequency division multiplexing may be implemented when the owner of the onboard modem 163 can talk through the interface while data is being transferred. At other times, when the device is not otherwise in use, the data transfer can use the whole bandwidth (300 Hz to 3.4 kHz in one example). While frequency division multiplexing may be common for analog cellular communication between the vehicle 102 and the network 161, and is still used, it has been largely replaced by hybrids of Code Division Multiple Access (CDMA), Time Division Multiple Access (TDMA), Space-Division Multiple Access (SDMA) for digital cellular communication, including but not limited to Orthogonal Frequency-Division Multiple Access (OFDMA) which may include time-domain statistical multiplexing. These are all International Telegraph Union (ITU) International Mobile Telecommunication (IMT) 2000 (3G) compliant standards and offer data rates up to 2 Mbps for stationary or walking users and 385 Kbps for users in a moving vehicle. 3G standards are now being replaced by IMT-Advanced (4G) which offers 100 Mbps for users in a vehicle and 1 Gbps for stationary users. If the user has a data-plan associated with the onboard modem 163, it is possible that the data-plan allows for broad-band transmission and the system could use a much wider bandwidth (speeding up data transfer).

The vehicle 102 may include a wireless local area network (LAN) device 173 capable of communication over, for example (and without limitation), an IEEE 802.11g network (i.e., WiFi) or a WiMax network. The vehicle controller 103 may be connected to the network 161 using the vehicle-based wireless LAN device 173 that utilizes, for example, a WiFi (IEEE 802.11) transceiver/antenna. This may allow the vehicle controller 103 to connect to the network 161 that may be in range of the network device 173. In some configurations, the network device 173 and the modem 163 may be combined as an integrated unit. However, features to be described herein may be applicable to configurations in which the modules are separate or integrated. The system 100 may further utilize the onboard modem 163 or network device 173 to communicate with the cloud or network 161.

The vehicle 102 may further include an onboard database 210 that is configured to store system related information. The onboard database 210 may include nonvolatile memory storage elements for storing data. The nonvolatile memory storage elements may be part of the vehicle controller 103 or may be an external storage device. For example, the onboard database 210 may store maps and location data for the system 100. The vehicle controller 103 may be programmed with speech recognition algorithms to translate spoken words into text that can be processed by the vehicle controller 103. The vehicle controller 103 may be programmed to generate routing instructions to a destination. The routing instructions may be provided to the user via the user interface 104 and/or speaker 113. The system 100 may track the current position of the vehicle 102 based on inputs from the GPS device 124.

A remote server 212 may be coupled to the network 161. The remote server 212 may maintain a remote database 214. The remote database 214 may include data from the onboard database 210. In addition, the remote database 214 may include information from other users, including crowd-extracted data. The remote server 212 may be configured to aggregate data from many users to provide data to individual users. The data provided may be aggregated such that no individual user information can be identified. For example, words and/or phrases may be received from a plurality of users. Before aggregating the data, user identification information may be removed or stripped from the data. Information may be copied between the onboard local database 210 and the remote database 214.

The user may operate a remote device 216. The remote device 216 may be a cell phone, a tablet, or similar device. The remote device 216 may include a controller or other computing device that is configured with memory, instruction execution capability, persistent and non-persistent memory, and input/output capability for operating connected hardware components. The remote device 216 may configured with communication capability (e.g., WiFi interface) and processing capability to run or execute applications. The remote device 216 may be in communication with the network 161. The communication may be wired and/or wireless. The remote device 216 may include an operating system and be configured to execute a first application 218 and a second application 220. The first application 218 and the second application 220 may be software programs that are executed by the remote device 216. The first application 218 and the second application 220 may include location or destination references. For example, the first application 218 and the second application 220 may be navigation and/or mapping applications. The remote device 216 (and first application 218 and the second application 220) may access the remote database 214 via the remote server 212. In some configurations, the remote device 216 may maintain a local copy of the onboard database 210 and/or the remote database 214. For example, the remote device 216 may include sufficient persistent memory resources to store a copy of the database locally on the remote device 216.

The system 100 may be configured to allow for entry of a destination by the user. The vehicle controller 103 may receive information entered by the user via the user interface 104 and/or the microphone 129. For example, the vehicle controller 103 may be configured to allow voice or keyboard input of a location or destination to generate routing instructions and route-related statistics. The location may be entered as an address into the system 100. In some configurations, the destination may be received from the user interface 104. The user interface 104 may present a keyboard on the user interface (e.g., touchscreen) through which the destination may be typed in by the user. In some configurations, the destination may be received through a voice recognition system that includes the microphone 129 and speech recognition algorithms executed by the vehicle controller 103. The voice recognition system may be configured to receive voice input via the microphone 129 and convert the voice input into text. The vehicle controller 103 may be programmed to execute a mapping application that converts addresses to geo coordinates. The geo coordinates may be in terms of a latitude and longitude that are compatible with GPS coordinates. The addresses may be further tagged with a location name. For example, if the location is associated with a business, the address may be tagged or labeled with the business name. The tag may define the label that is displayed on a map or in a list on a display screen. The tag or label may be associated with the location coordinates and stored in the onboard database 210.

The driver may know the name of a business, but not the address. The vehicle controller 103 may receive user input of the business name and may output a list of addresses associated with the business name to the user interface 104. For a business with many locations, the list may include those addresses that are nearest to the present location. The list may be displayed to allow the user to choose a desired location. The list may be sorted or ordered by distance to the present location. The user may view the list to select the desired location. For example, the list may be presented on a touch screen of the user interface 104 and the user selection may be obtained from the screen coordinates by touching the desired list element. The list elements may be shown as addresses that include a street address, a street name, and a city. The vehicle controller 103 may also output the list as audio output to the speaker 113.

With advances in machine learning, it is possible to predict a driver's destination. The destination may be used for route guidance and/or trip assistance. Route guidance may include generating a set of instructions for guiding the user from a present location to the destination. Trip assistance features may include suggesting optimal routes based on traffic information. For example, the vehicle controller 103 may implement a traffic management feature that is configured to recognize heavy traffic along the present direction of travel and suggest an alternative route to the expected destination. The vehicle controller 103 may be configured to predict a next destination based on previous destinations. The vehicle controller 103 may store locations that have been visited previously. The vehicle controller 103 may store a location (e.g., as GPS coordinates) at every ignition off event. When the ignition key is placed in the off position, the vehicle controller 103 may record and store the present GPS coordinates into nonvolatile memory. The GPS coordinates may be compared to previously stored coordinates to aggregate destination data. For example, a count associated with a set of GPS coordinates may be incremented each time the vehicle controller 103 detects an ignition off event at the location. The predicted destinations may also be determined based on the day and time. Previous destinations may be associated with a day and time. For example, many drivers may have a predictable driving schedule such as between home and work. Starting and ending times for such trips may be predictable. A driver with a regular schedule may have additional predictable destinations (e.g., gym, childcare center). Date and time information may be stored along with the trip starting and ending locations.

The vehicle controller 103 may store previous destinations and associated data in the onboard database 210 for later retrieval. The vehicle controller 103 may be configured to predict the next destination based on the previously-learned route data. For example, the previous route data may show that the vehicle 102 is driven on weekdays from work starting at 5:00 pm to home. On a weekday, if the vehicle 102 is started at 5:00 pm and present location is identified as the work location, there is a high probability that the destination is home. The vehicle operator may benefit as the system 100 may be able to route and/or assist the operator to the next destination with minimal operator action. Although the driver may know the way to the location already, the system may improve routing based on traffic conditions. For example, if traffic is extremely heavy one day, the system 100 may suggest an alternate route with less traffic.

The vehicle controller 103 may be programmed to learn a number of base locations. Base locations may be predetermined destinations such as work and home. Base locations may also be defined as frequent destinations. The base locations may also include schools, gyms, and/or daycare centers. The vehicle controller 103 may flag a destination as a base location when the destination has been visited at least a predetermined number of times. Base locations may also be input by the user. For example, the user interface 104 may provide a way to enter standard base locations such as home and work. In some configurations, the system 100 may support any number of user-definable base locations. The vehicle controller 103 may be programmed to receive addresses associated with these locations entered by the user via the user interface 104. In some configurations, the user may enter a label/tag for the location.

Communicating the locations to the user is a challenge since the user is generally not fluent in addresses and geo coordinates. To better communicate the locations to the user, the vehicle controller 103 may be configured to tag each location with a meaningful label. The difficulty in communicating the location is in selecting tags that convey the location in a meaningful and useful way to the user. It may be beneficial if the system 100 could express a location or destination in terms that users are familiar with. For example, users may not know destination addresses specifically but may recognize locations when described relative to other frequently visited locations (e.g., base locations). The vehicle controller 103 may communicate with the user in terms that are relative to these base locations/destinations. In addition to communicating predicted locations in this manner, it may be useful to allow the user to express locations in the same manner when entering a destination.

The vehicle controller 103 may be programmed to implement a reverse geocoding algorithm that converts locations (e.g., geo coordinates) into corresponding street addresses. Unfortunately, not all users know the actual street addresses of locations that they frequent. Further, for example, if a parking location is towards the back of a property, the actual parking location may be closer to the street behind the property than the street specified by the address. Parking/destination mismatch may occur with parking garages in cities. As a result, the street address does not necessarily result in identifying the actual location that the user visits. For example, the user may prefer to park in a lot behind the actual destination which may yield geo coordinates for a different business or a different street address. In these examples, a user entering the actual address of the location may be routed to the actual address rather than the parking lot behind the destination as desired.

The system 100 may be configured to use the name of the closest point of interest (POI) associated with an address. However, people do not always park closest to the ultimate destination. There may be more spots available in front of an adjacent location. The driver may park closer to an adjacent location than at the ultimate destination. Using the closest POI may not necessarily reflect the location visited.

A purpose of storing previous destinations may be to facilitate the prediction of future destinations. Past destinations may have a higher probability of being visited in the future. The vehicle controller 103 may store additional information along with the location data of these previous destinations. For example, the vehicle controller 103 may store starting locations, trip start times, and trip end times associated with the locations. The user may have a predictable pattern of driving from one location to another. If the destination prediction algorithm recognizes this tendency, the vehicle controller 103 may assign a higher weighting or probability factor to the destination. A variety of methods for predicting the destination are available. For example, U.S. Pat. No. 9,020,743 issued to Ford Global Technologies LLC describes one such prediction scheme, the disclosure of which is hereby incorporated by reference. Other prediction schemes are also possible.

To improve the presentation of locations to the user, the vehicle controller 103 may implement various strategies. The presented locations or destinations should reliably indicate the locations in a manner that is useful to the user. The use of reverse geocoding and closest POI strategies may not result in user-friendly tags and labels being presented. Addresses and POI's may not be recognizable to the user and, therefore, may be of little use. The solution should result in the presentation of meaningful tags for the user. The tags may be a word that is a noun or words that are a noun phrase that describe the destination/location.

The system 100 may be configurable to allow the user the option to have the system 100 generate predictive tag phrases for locations. For example, the vehicle controller 103 may be configured to receive an input indicative of the option being enabled or disabled. The vehicle controller 103 may be configured to facilitate the entry of tag phrases according to the user's preferences. Over time, the vehicle controller 103 may learn the preferred tags and present and/or use the tags when identifying locations.

One possible solution is to allow the user to manually tag locations. To associate a tag with each location, the vehicle controller 103 may query the driver after arriving at the destination or at a later time. The vehicle controller 103 may present a query to the user that requests that the driver associate the final location with a tag. As an example, the vehicle controller 103 could present POIs that are within a predetermined distance of the location for the user to select via the user interface 104. In other configurations, the system 100 may request the user to verbally identify or tag the location. Using speech recognition, the vehicle controller 103 may convert the verbal input into a tag or label and store the tag or label with the location. However, this process may be a nuisance to the driver if done often. Improved solutions may be assist the user in building meaningful tags and/or generating the tags automatically.

The system 100 may be incorporate intuitive naming (tagging) of locations and destinations. Further, for some locations, a generic label such as a business name may not be very useful. For example, when a location or destination is a business with multiple locations, the generic label may not be suitably descriptive of which of the multiple locations is being referred to. A more useful tag or label may be one the closely matches how the user recalls or accesses the location. A more useful tagging strategy may be to generate a tag phrase that provides more information about the location relative to locations that the user is familiar with (e.g., the base locations). For example, the tag phrase may indicate the location as being relative to a base location. For example, a grocery store may be referenced as "grocery near home" or "grocery near work", where "home" and "work" are base locations. The tag phrase may include other types of words in addition to nouns to describe the location. As more base locations are learned, more relational tag phrases may be utilized. The tag phrases may include relevant location tags that collectively describe a location according to learned preferences of the user.

Locations may be described in a variety of ways. Locations may be described as nouns. Nouns may include a proper noun describing a name of a specific place. This may include a specific business name. Nouns may include generic names or descriptions. For example, generic descriptions for locations may include, but are not limited to, words such as gym, work, home, pool, grocery store, beach, restaurant, theater, movies, bookstore, music store, and museum. The generic descriptions may also include verbs that function as nouns (e.g., gerunds). For example, generic description may include activities or activity types such as bowling, shopping, skiing, and dining. The generic descriptions may include categories that may indicate specific types of locations such as food, entertainment, music, bars, and art. Specific locations may be associated with one or more categories. Base locations may be associated with a tag that is a noun. A location may also be associated with a symbol or image. The symbol or image may be depicted graphically on the display.

The tag phrase may include a preposition. The preposition may express a relationship between other words in the tag phrase. Prepositions may include words such as near, on, at, after, before, between, across from, around, and behind. The use of prepositions in the tag phrase can relate a location to another location. Another useful preposition may be "on the way to" and may be used in referencing to a known or base location (e.g., home, work). This allows for locations to be described relative to known or identified locations (e.g., home, work). As the vehicle controller 103 learns more locations, additional locations may be described in relative terms. The tag phrase may express a relationship between a location associated with the destination and a location associated with a learned location tag. The tag phrase may express a relative positional relationship between a location associated with a destination and a location associated with a learned location tag.

Locations may be further described as being associated with a person. The person may be described by name using a proper noun. The person may also be described by descriptive or generic terms such as wife, son, daughter, spouse, kids, parent, neighbor, boss, teacher, professor, and mechanic. Additional descriptive terms may be available without limitation. Tag phrases may include an association of a location with a person. The tag phrase may include a possessive term to indicate ownership or association with a location. For example, a grocery store may be referenced as "grocery near wife's work" or "grocery near parents' home."

The system 100 that can provide and respond to tagged locations as described may be more intuitive to users. The user may be able to better understand and convey locations using these strategies. A user may have any number of frequent destinations that the system 100 may learn and tag. Initially, primary base destinations such as home and work may be identified. The system 100 may also be configured to learn additional frequent destinations over time. For example, the system 100 may learn that the user frequently goes to a gym. The gym may be included as a base location and tagged as "my gym" and other nearby locations may be referenced as being "near my gym". This allows the user to query for places near their preferred gym. For example, a user may be on the way to the gym and realize that they need to stop at a drug store. The user could present queries such as "drug stores near my gym" or "drug stores on the way to the gym" to find a suitable drug store.

The vehicle controller 103 may also be configured to incorporate symbols and/or icons for tagging locations. In addition, emojis may be incorporated in the tagging process. The icons and emojis may be used as shortcuts and may allow more compact display of tag phrases.

The vehicle controller 103 may be configured to learn the preferred manner that the user references locations and/or destinations. The user location references may be derived from user-entered queries regarding locations. The vehicle controller 103 may learn from the user's own manual tagging activities. For example, the vehicle controller 103 may monitor and store previous words and categories that the user has used for previous manual tagging activities. User location references may be a sequence of words that are entered via the user interface 104 (e.g., typed on touchscreen or verbally through voice recognition). In addition, the preferred user location references may be derived from previously selected predicted destinations. Over time, the vehicle controller 103 may adjust the way that the locations and predicted destinations are presented based on the previous selections of the user. The vehicle controller 103 may be configured to express the locations in a similar manner as to how the user references locations. As such, the vehicle controller 103 may provide customized location references dependent on the manner in which each user identifies locations. In a vehicle having multiple drivers that can be identified (e.g., by a key fob), the vehicle controller 103 can identify locations differently for each driver according to their individual preferences.

The vehicle controller 103 may be programmed to facilitate the tagging of locations. Upon reaching an untagged location, the vehicle controller 103 may output a matrix of words and/or symbols associated with the location to the user interface 104. The matrix of words may include names of nearby businesses, streets, categories associated with nearby locations (e.g., restaurant, food). The user may construct a tag phrase by touching the desired words and symbols. The vehicle controller 103 may receive the selected elements and store that associated tags as the tag phrase for the location. This feature is discussed in more detail with reference to FIG. 4 and FIG. 5.

The vehicle controller 103 may be programmed to implement one or more trackable/collapsible machine learning models to keep track of a sequence of words in terms of category and occurrence. Conceptually different models (different decision patterns) may be activated to provide the next likely words for each category. The conceptually different models may perform separate adaptations to capture conceptually different naming conventions and logic. Each model may have a different hierarchy in which patterns of activations may lead to simplified naming conventions and logic. Each individual model's performance may guide the respective firing levels to adapt over time. The vehicle controller 103 may implement a collaborative learning algorithm in which outcomes from the more accurate model may be weighed more heavily. The vehicle controller 103 may receive and utilize user selections to reinforce learning of preferred word sequences.

The vehicle controller 103 may implement different strategies for predicting location tags. A first strategy may be to implement a category-based Adaptive Markov Model (AMM) and/or a Hidden Markov Model (HMM). The Markov model assumes predictions from a known distribution (e.g., a fair coin toss with a distribution 50% heads and 50% tails). The Hidden Markov model assumes predictions from one of multiple distributions (e.g., fair coin toss with a distribution 50% heads and 50% tails and an unfair coin toss with a distribution 60% heads and 40% tails). In the case of the HMM, the number of hidden states (e.g., number of coins) and the state to use at the time of the prediction are driven by the data. The strategy may include dividing words in a phrase/response into functional categories. For example, the functional categories may include people, generic descriptors, partial addresses (e.g., street name or city), and prepositions, icons, and/or emojis. The functional categories may be further divided into sub-categories. The vehicle controller 103 may then utilize a 1/2/3/N AMM or HMM to learn the patterns in the sequence of words that show up in terms of the functional categories. The value of N may be a predetermined number and the vehicle controller 103 may store and update 1×1, 2×2, up to N×N matrices as the user interacts with the system. For example, separate tables with indices 1 through N may be stored in memory. The vehicle controller 103 may receive inputs from previous user selections and previous user inputs derived from previous user interaction with the system 100.

The vehicle controller 103 may be programmed to learn tendencies and/or patterns for initial categories, including a sequence. For each entry in the tables, relative frequencies of utilization may be tracked. To improve the chances of learning words and categories, a predetermined number of words and categories may be tracked. The predetermined number may be selected to balance the speed of response and the accuracy of the outcomes. The system may be initialized with default values. For example, increasing the predetermined number may increase accuracy at the expense of response time.

The vehicle controller 103 may also implement a word-based AMM and/or HMM strategy. The word-based strategy may apply evolving (recursive) clustering to extract frequent words from observation of the location tagging activities. The word-based strategy may learn tendencies and/or patterns for initial word constructs including any associated sequences. Frequent locations, day and time may be handled as with interval encoding (for learning) and reside at the top of hierarchy.

The vehicle controller 103 may perform the category-based strategy and the word-based strategy in parallel. The category-based strategy and the word-based strategy may be competing composition strategies. The vehicle controller 103 may adapt the firing levels of each strategy over time depending on which strategy is working more effectively. The vehicle controller 103 may be programmed to evaluate the effectiveness based on the selected response or input. Weighting factors may be associated with each strategy. For example, when a list is presented, the strategy that created the selected item may receive an increased weight. Future lists may order or prioritize the elements based on the weight. The vehicle controller 103 may be configured to include additional strategies over time. In some configurations, additional strategies may be incorporated via software updates. Simplified strategies may be extracted separately from the category-based strategy and the word-based strategy.

As an example, the system 100 may be configured to provide three predictions of words in each category and may be configured to track at least three words in each category. Tracking more than three words allows for movement in ranking and may permit new words to emerge over time. Words may rise and fall in priority based on the user interaction with the system 100. For example, words present in selected items and/or input phrases at a higher frequency may rise in priority, while words that are frequently absent may fall in priority.

The vehicle controller 103 may implement a space encoding strategy that is applied to inputs for which numerical closeness implies a degree of similarity. Finer granularity of the partitions may lead to stronger conditional information and learning time may increase for each partition. Information aggregation may be performed to overcome sparsity and generalize knowledge. Each element of the space encoding structure may be associated with multiple locations. Each location element of the input space encoding structure may be represented by another table. The table may include tagging information related to each of the location elements. A relative frequency associated with each location may be stored in the table. Tag phrases and words derived from the category-based strategy may be stored in the table. Associated with the category-based strategy may be the relative frequency of the resulting tag phrases. Additional data and information associated with the category-based strategy may be stored in the table. Tag phrases and words derived from the word-based strategy may also be stored in the table. Associated with the word-based strategy may be the relative frequency of the resulting tag phrases. Additional data and information associated with the word-based strategy may also be stored in the table. The tables may be updated over time with results from the category and word-based strategies.

Figure 2A:
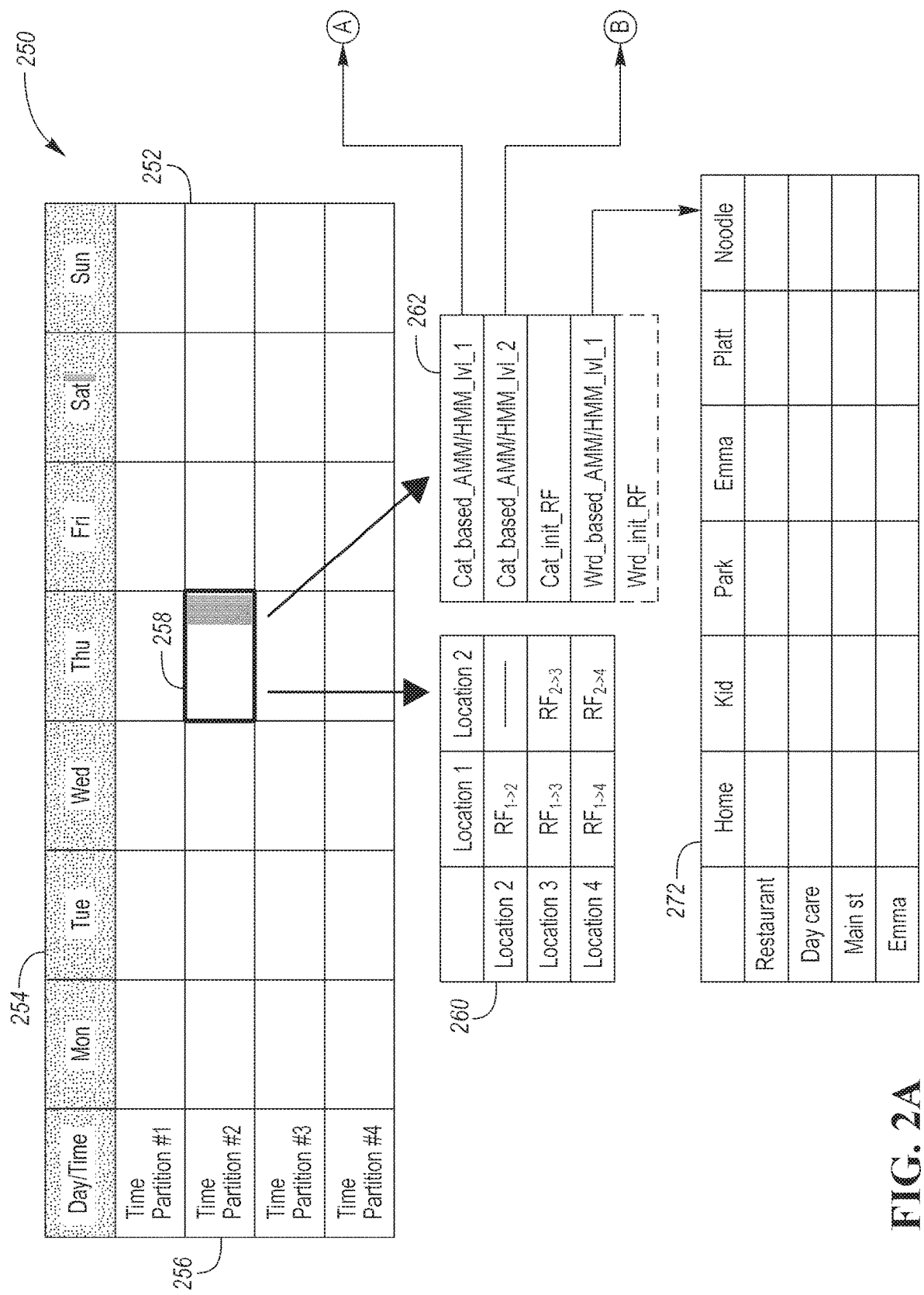
FIG. 2A is an example of an input space encoding table and mapping to location tables and category and word-based tables.
Figure 2B:
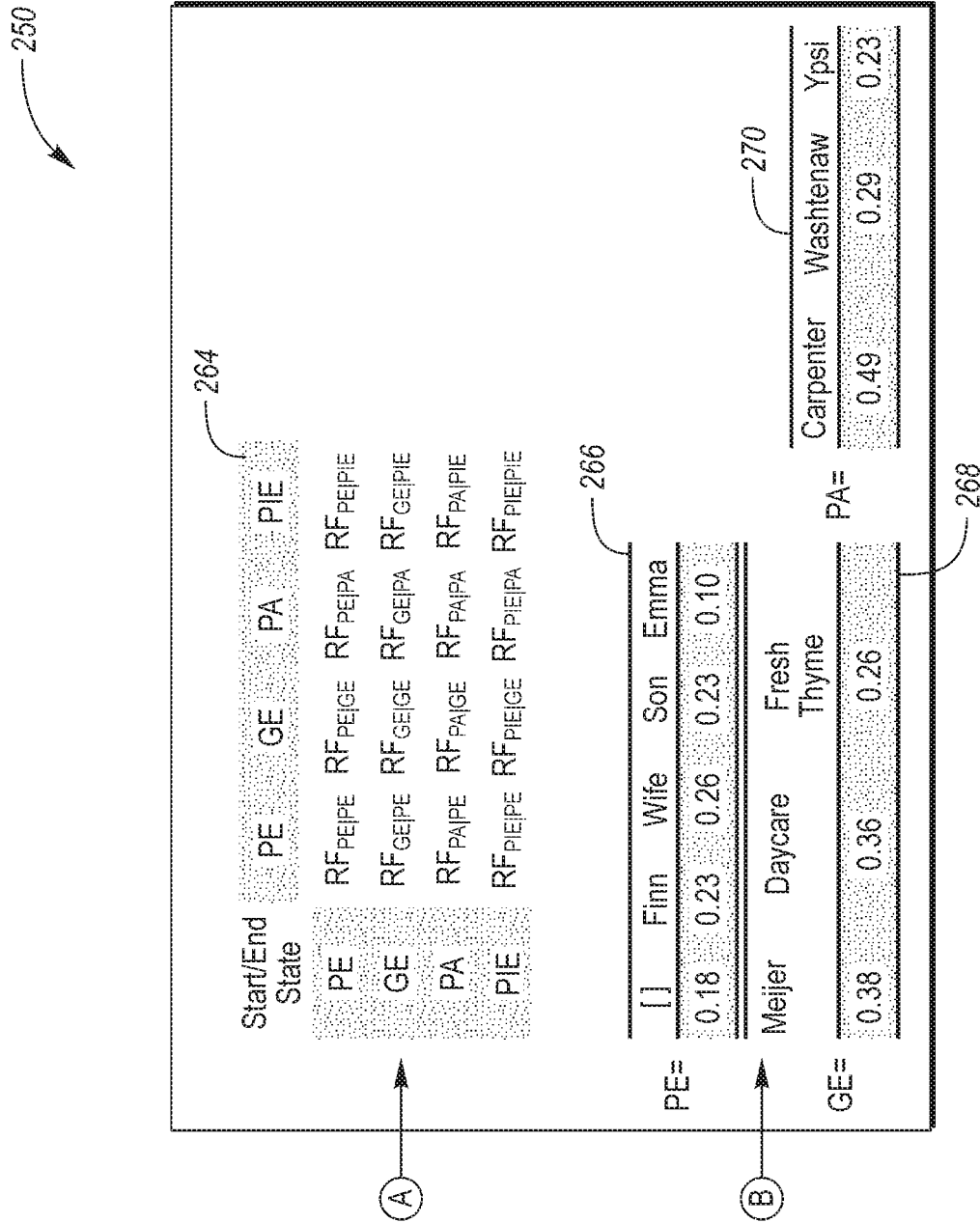
FIG. 2B is an example of mapping to category and word-based tables.

The vehicle controller 103 may implement an input space encoding strategy for predicting destinations. FIGS. 2A and 2B depict an example of data structures 250 for implementing the input space encoding strategy. The strategy may preserve major context information within predefined grids. For example, the vehicle controller 103 may allocate storage space for a grid 252 that is used to track location and tagging information related to day and time. A first axis or index 254 may be labeled as a day of the week. A second axis or index 256 may be labeled with a time partition representing a time interval within the day. The grid 252 may be a two-dimensional structure. Each element of the grid 252 may correspond to one or more locations. Each cell may correspond to a day of the week and a time range. For example, the predefined grid 252 may define a full weekly calendar having forty-two cells with each cell representing a four-hour window. The time windows may be non-overlapping. In some configurations, the time windows may overlap.

The vehicle controller 103 may be configured to monitor for a present day and time to determine which cell of the grid 252 to access at a given time. An active cell 258 may be defined as the one or more of the cells of the grid 252 that corresponds to the present data and time. In the case of overlapping time windows, more than one cell may be active at a given time. In the example, the active cell 258 is activated when the present day is Thursday and the time falls within time partition two. The activated cell 258 may be used for learning and location recall. The learning may take place one cell at a time. Predictions may be made with one or more cells activated using a weighting strategy for the activated cells (e.g., 258). Using more than one cell for predictions may provide more predictable outcomes and may compensate for missing inputs and/or uncertainty. Using multiple cells also allows for activities that occur near time partition boundaries and allows the system to evolve (e.g., change of schedule) over time. In addition, using multiple cells for prediction compensates for knowledge sparsity at the beginning of the learning process. Each grid element may have multiple locations with weighting factors and each of the locations may be associated with multiple tag phrases.

Each of the cells (including the activated cell 258) may define an associated location transition table 260. The location transition table 260 may define the relative frequencies associated with transitioning from one location to another. For example, the vehicle controller 103 may receive the GPS coordinates of the present location and compare the GPS coordinates to starting locations in the location transition table 260. If there is a match, the vehicle controller 103 may check the relative frequencies associated with one or more possible destinations stored in the location transition table 260. The vehicle controller 103 may select the location having the greatest relative frequency as the probable destination.

Each of the cells (including the activated cell 258) may further define one or more location tagging tables 262. Each location defined in the location transition table 260 may be associated with a location tagging table 262. The location tagging table 262 may define and store information related to location tagging. For example, each location tagging table 262 may define one or more additional tables that are used in the tagging process. Note that the location transition tables 260 and the location tagging tables 262 may dynamically change over time as more locations are visited and additional locations, tag words and phrases are learned. Over time, the tables may represent reasonably accurate information regarding the user's destinations and preferred tag phrases.

The location tagging table 262 may include a reference to a first-order category table 264. Novel categories and words also may be detected through crowd-sourcing, data mining, and/or analysis of cumulative statistics of words not covered by the current knowledge base. The first order table 264 may define sequential patterns of the main categories that may include people (PE), generic (GE), partial address (PA), and Preposition/Icon/Emoji (PIE) and may be modeled using a Personalized Adaptive Markov Model (PAMkv). The first order table 264 may define elements that define the relative frequency of a category following another category. By observing user selections and inputs over time, the relative frequencies may be updated. In addition, the vehicle controller 103 may be configured to determine preferred word sequences of the user. Using this information, the vehicle controller 103 may construct tag phrases using the preferred word sequences of the user. Over time, the vehicle controller 103 may learn to reference locations in the manner preferred by the user.

The first-order table 264 in which the next likely word type is based on the previous word type (e.g., left column). The first-order table 264 may depict the relationship between two consecutive words or word types in a sequence. The location tagging table 262 may further define a number of second-order tables. In the example, the location tagging table 262 defines a first second-order table 266, a second second-order table 268, and a third second-order table 270.

The second order tables may define relative frequencies for the next word of a selected category (e.g., PE). For example, the first second-order table 266 may define relative frequencies of person's names that occur. The table may include a relative frequency of no persons being mentioned. The second second-order table 268 may define relative frequencies for the next word of another selected category (e.g., GE). The third second-order table 270 may define relative frequencies for the next word of yet another selected category (e.g., PA). Note that a second-order table may be defined for each category that is defined.

Additional tables of higher order may be defined. The higher order tables may define the relationships between more than two consecutive words. For example, a higher order table may be able to define relative frequencies of a transition from PE to GE occurring following by a transition to the remaining types. A higher order table may be sparsely populated and may take a longer time to learn. However, a lower order table can be obtained from a higher order table. Due to storage space, the maximum order of the table may be defined to be third-order or fourth-order.

Additional tables may be maintained for each of the categories. The tables may be updated over time the vehicle controller 103 receives or generates new information. For example, the vehicle controller 103 may be configured to analyze voice or typed inputs for data in each of the categories to update the tables. The vehicle controller 103 may be configured to update the data for previously referenced words and categories and may add data for newly referenced words and categories to the tables.

The location tagging table 262 may further define a word-based table 272. The word-based table 272 may define the relative frequency of a word following another word. The word-based table may define a grid that is indexed by a first word and a next word. The vehicle controller 103 may predict a next word as the element in the word-based table 272 that has the highest relative frequency. For example, the vehicle controller 103 may identify the first word and examine each element of a row associated with the first word to find the element with the highest relative frequency. The word associated with the associated column may be selected as the probable next word.

The location tagging table 262 may further define a matrix indicating the likelihood of first appearing categories and words. The initial relative frequency values for categories may be assigned a predetermined value (e.g., 0.05). The initial relative frequency values for categories may be assigned a predetermined value (e.g., 0.1).

Content in the same category may be modeled through learning of the adaptive relative frequencies of that content. For example, the vehicle controller 103 may implement a formula for positive/negative reinforcement that may be described as:

$$RF_{outcome\ i,j,k}(t+1) = \alpha RF_{outcome\ i,j,k}(t) + (1-\alpha) RS_{outcome\ i,j,k} \quad (1)$$

where $RF_{outcome\ i,j,k}$ is a relative frequency of an outcome given a present state, j and k are context data related to the matrix, and $\alpha$ is a coefficient or learning rate that is less than or equal to one. For example, j may be associated with a specific preceding word or word category and k may be associated with a date/time. The j values may reference competing alternatives that may be words or categories. The RS value may be assigned a value of 0 or 1. The vehicle controller 103 may compute the relative frequencies when update information is received. The RS value may be assigned a value of one when an associated alternative has occurred. The RS value may be assigned a value of zero when the associated alternative has not occurred. Outcomes associated with other j and k values may not be updated as the context data is not associated with those outcomes. For an alternative that has occurred, the RF value may be expected to increase (positive reinforcement). For an alternative that has not occurred, the RF may be expected to decrease (negative reinforcement). RF values whose context j and k parameters do not match the current parameter values may be left untouched.

As an example, a first order word-based matrix is depicted in Table 1. The matrix of Table 1 may represent a word-based table as described above. The grid elements represent the relative frequency of the word sequence moving from the column word to the row word. For example, the relative frequency of the word "near" following the word "restaurant" may be 0.37. The columns and rows may represent observed words from previous tagging events.

TABLE 1

Example starting matrix.

| | restaurant | near | at |
|---|---|---|---|
| near | 0.37 | — | 0.03 |
| on | 0.23 | 0.03 | 0.01 |
| Packard | 0.02 | 0.23 | 0.15 |
| Home | 0.16 | 0.35 | — |
| Platt | 0.05 | 0.14 | 0.27 |

The matrix may be updated as additional tagging events are generated. For example, a user may enter a tag phrase as "Panda near Home." Table 2 depicts an example of the updates to the matrix based on the tag phrase. The matrix may be updated to learn from this tagging event. The vehicle controller 103 may be programmed to parse the tag phrase to obtain the word sequence and transitions between words. A first sequence may be defined as "Panda near." The vehicle controller 103 may update the word-based matrix based on this sequence. As a result, a column may be added to include the word "Panda." Further, an initial relative frequency may be entered in the cell corresponding the word "near." For example, the initial value may be 0.05. Other cells associated with Panda may remain uninitialized as there are no other occurrences. A second sequence may be defined as "near home." The words "near" and "home" already appear in the table with relative frequencies assigned. In this example, the RS value for the cell corresponding to "near" and "home" is set to one, while other RS values are set to zero. Utilizing equation (1) results in the relative frequencies for the "near" column being changed. Note that for the cell corresponding to "near" and "home", the relative frequency is increased, while the relative frequency for other cells in the column are decreased.

TABLE 2

Example of matrix updated based on tagging event.

| | restaurant | near | at | Panda |
|---|---|---|---|---|
| near | 0.37 | — | 0.03 | 0.05 |
| on | 0.23 | 0.0285 | 0.01 | — |
| Packard | 0.02 | 0.2185 | 0.15 | — |

TABLE 2-continued

Example of matrix updated based on tagging event.

| | restaurant | near | at | Panda |
|---|---|---|---|---|
| Home | 0.16 | 0.3825 | — | — |
| Platt | 0.05 | 0.133 | 0.27 | — |

The vehicle controller 103 may be configured to automatically, at periodic intervals, consolidate tag phrases and locations. Most frequently accessed tags phrases may be given higher weights. Least frequently accessed tag phrases may be removed. Words and category data may be updated to reflect the frequency of usage. The consolidation may also be prompted or initiated by the user.

Figure 3:
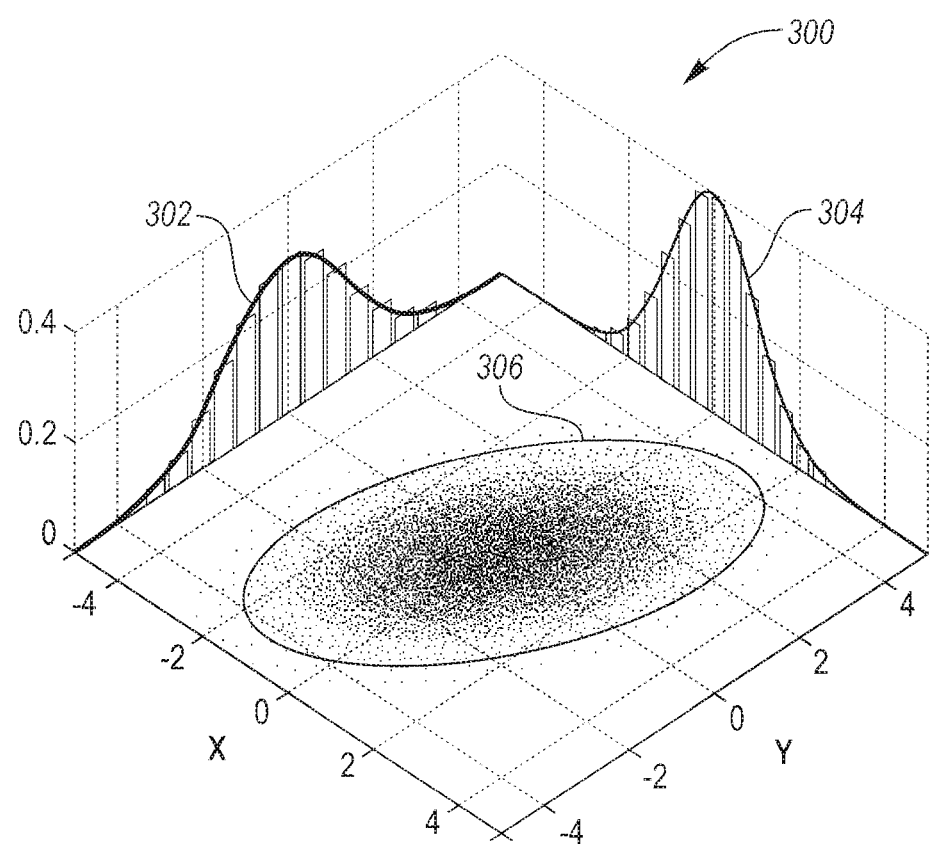
FIG. 3 is a graph depicting a combined distribution profile for two separate inputs.

FIG. 3 represents a graph 300 of a possible distribution profile. A distribution 306 may be defined as a number of observations of each X and Y value occurring. A relative frequency (not shown) may be associated with each combination of X and Y values. A marginal probability of Y 302 and a marginal probability of X 304 may also be defined. The marginal probability of Y 302 may represent a probability associated with each Y value. The marginal probability of X 304 may represent a probability associated with each X value. The distribution may be marginalized or collapsed against an input that is missing or too noisy. The distribution may be combined (as weighted sum) to make predictions of conditional or overall average type of predictions. The combined distribution may be further collapsed if desired. The distribution-based learning allowed flexibility for adjusting inferences for precision and/or predictability.

The relative frequencies may be used to predict the next word in a sequence. For example, if the present word is categorized as being in category PE, the relative frequencies may be used to assign a probability of the next word in the sequence being in the GE, PA, and PIE categories. This may be used to construct the tag phrase as a word sequence. The specific word sequence may be determined by the relative frequencies determined above. Tag phrases may be built using the words with the highest relative frequencies. Over time, the vehicle controller 103 may learn the preferred ordering and sequencing of words and categories of the user. Knowing the preferred ordering and word choices, the vehicle controller 103 may construct tag phrases for different locations in a similar manner.

The system 100 may be configured to use crowd-extracted latent patterns to expand the learning of the system. For example, the vehicle controller 103 may receive tagging data aggregated from other users. Crowd-extracted patterns may include words and categories not covered by the present knowledge base. Crowd-extracted data may aid in expressing how one relates locations to certain base locations. For example, a tag phrase may be expressed as "Ford Dealer near home". Crowd-extracted data may be used to express how one relates a location to geographical areas such as cities, streets. For example, a tag phrase may be expressed as "Ford Dealer in Dearborn" or "Ford Dealer on Main Street". Crowd-extracted patterns may also help to express how one relates locations to existing ones. The crowd-extracted patterns may be used to build initial tag phrases when little or no learning data is available. Over time, the individual preferences may become apparent and the tag phrases may change over time to reflect the individual user preferences.

The vehicle controller 103 may allow for multiple tag phrases for a single location. A location may be described by multiple tag phrases. For example, a location may be tagged as "Ford Dealer near home," "Ford Dealer on Main Street,"

or "Ford Dealer in Dearborn". The vehicle controller 103 may include a self-purging mechanism in which names for the same location may be purged if the tag phrases are too similar. It may be preferred to keep tag phrases that are maximally different from one another. This helps to ensure the tags associated with a location have some differences. Tag phrases that are unused or have low relative frequency of usage may be purged from the onboard database 210. When tags are purged, the usage frequencies of the purged tag may be combined into the usage frequencies of the closest tag. Purging a particular tag phrase may include merging the data associated with the tag phrase into a similar or related tag phrase.

The system 100 may include a combination of application/cloud service/personal profiles such that tagged locations may be accessed from different applications on different platforms. The locations and tag phrases may be stored in a remote database 214 that is accessible from the network by any device. The onboard database 210 may be transferred to a server and/or copies of the database 214 may be transferred to each device or platform. The vehicle controller 103 may periodically update the onboard database 210 to ensure that each device or platform is accessing the latest data. This allows the user ubiquitous access to the location tag data in the same manner on any of their vehicles and devices. Any application or device that refers to locations may use the same tag phrases that the system 100 has learned as the user preference. The system 100 may be configured to provide secure access to the database to prevent unauthorized access.

The vehicle controller 103 may implement the algorithms described as a background learning model to improve voice recognition accuracy. The vehicle controller 103 may implement features to pre-populate and/or predict a short tag for the user to refine to facilitate automation of the tagging process.

Figure 4:
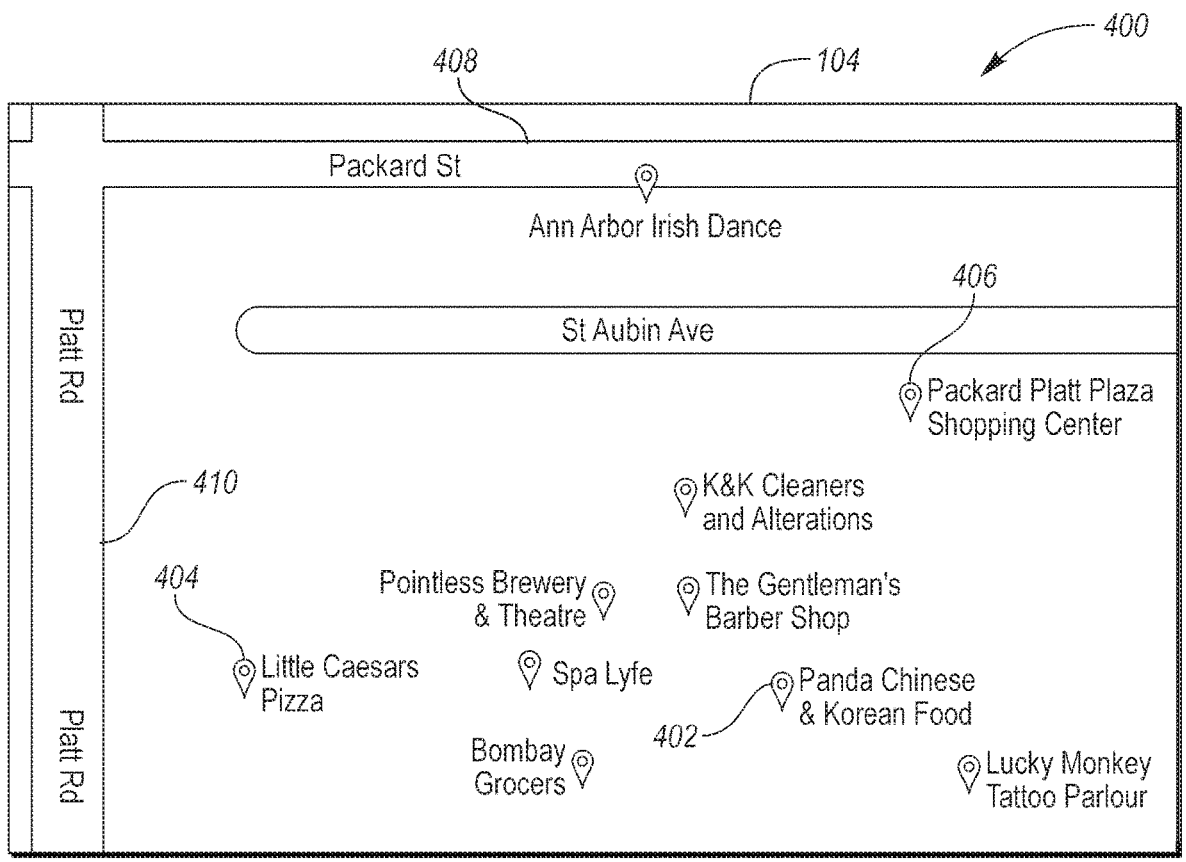
FIG. 4 is an example of a map including possible destinations.

FIG. 4 depicts an example of a map 400 of an area around a present vehicle location. The map 400 may include various features. For example, the map 400 may identify streets such as a first street 410 (e.g., Platt Road) and a second street 408 (e.g., Packard Street). The map 400 may also identify various locations and/or points of interest. For example, a symbol may be used to identify a first location 402 (e.g., Panda Chinese & Korean Food), a second location 404 (e.g., Little Caesars Pizza), and a third location 406 (e.g., Packard Platt Plaza Shopping Center). Additional locations and points of interest may be identified.

Figure 5:
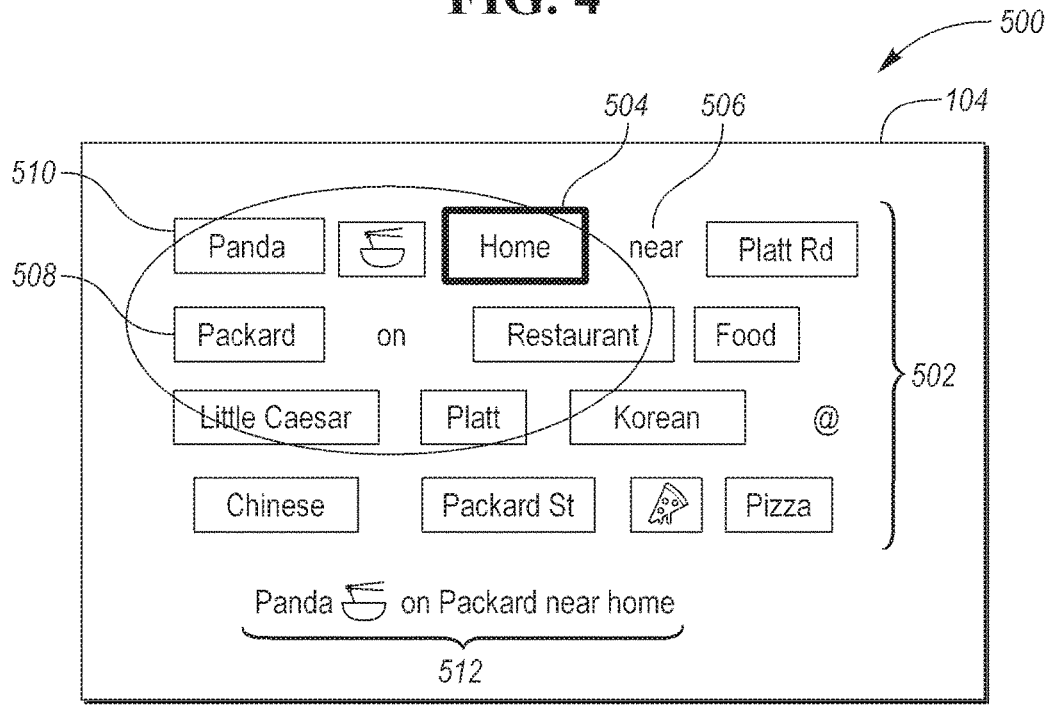
FIG. 5 is an example of a display for inputting tags for generating a tag phrase.

FIG. 5 depicts a possible content display 500 associated with the map 400. The vehicle controller 103 may output the content display 500 to the user interface 104 for presentation to the user. The content display 500 may present a set 502 of descriptors (e.g., words and categories) that identify nearby locations. The descriptors may be presented as a grid of blocks identified with words and/or symbols. Locations and features from the map 400 may be identified in one or more blocks. For example, a first descriptor 510 may be labeled as "Panda" to identify the first location 402. A second descriptor 508 may be labeled "Packard" to identify the second street 408 from the map 400. The content display 500 may also present descriptors for base locations. For example, a third descriptor 504 may be labeled "Home" to identify a known location. The content display 500 may also present descriptors for prepositions. For example, a fourth descriptor 506 may be labeled as "near" to identify a term for describing the location.

The content display 500 may be displayed on the user interface 104 in response to arriving at a location (e.g., turning ignition off). The set 502 of descriptors may be derived from the relative frequencies of previously learned terms. For example, prepositions that are frequently used by the driver may have a greater probability of appearing in the content display 500. The user may be prompted to select the descriptors to describe the present location. Using the touchscreen of the user interface 104, the user may touch desired descriptors to input data to cause the vehicle controller 103 to generate a tag phrase 512. The tag phrase 512 may be displayed on the user interface 104. For example, the tag phrase 512 may be displayed below the set 502 of descriptors. The content display 500 may be configured so that descriptors of greater priority are displayed in the upper left corner. The content display 500 provides a useful aid for helping the user construct preferred tag phrases. The tag phrase 512 may be stored with the location data and processed by the learning algorithm described.

Figure 6:
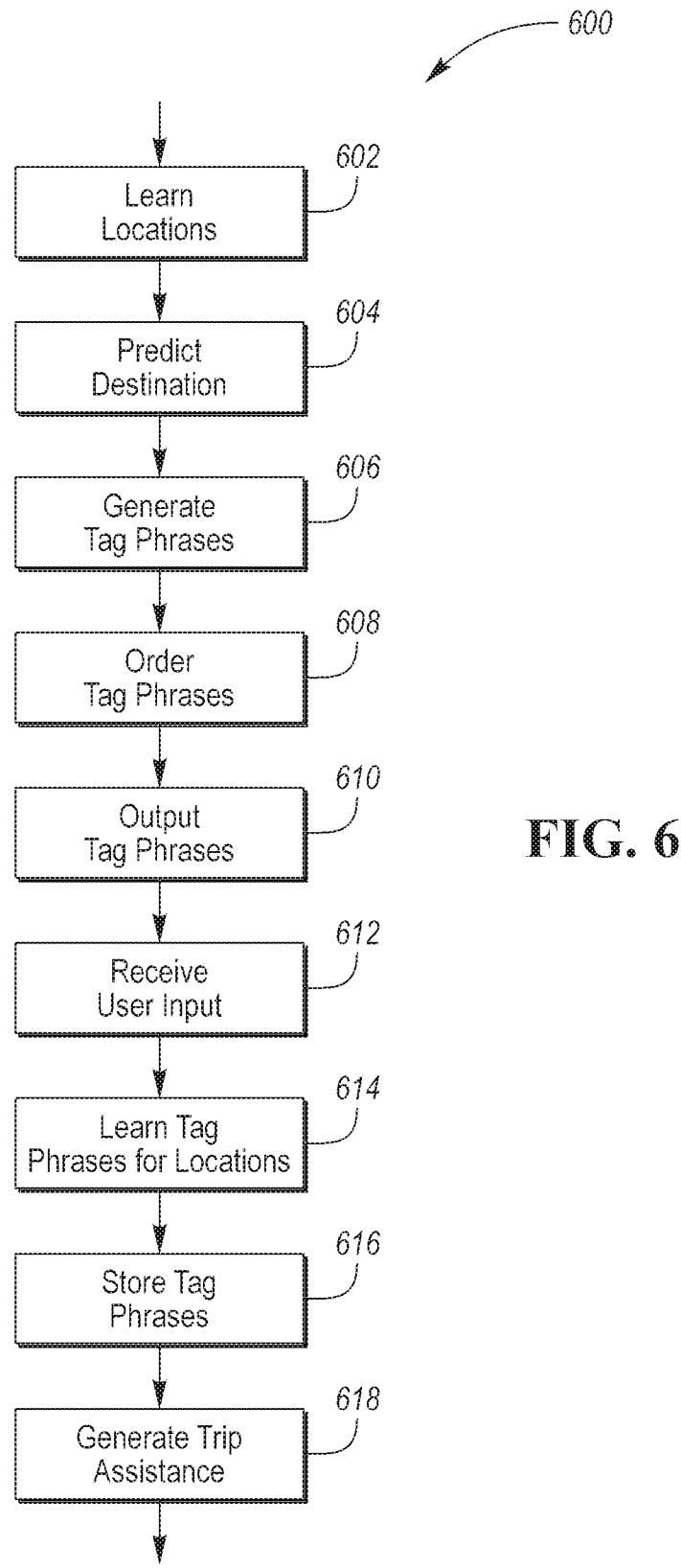
FIG. 6 is a flowchart for a possible sequence of operation for a system.

FIG. 6 depicts a flow chart 600 for a sequence of operations that may be implemented by the vehicle controller 103. At operation 602, the vehicle controller 103 may learn locations or destinations as described previously herein. The locations may be user identified and/or learned at key-off events over time. The location information may be stored for later use. Location data may be sampled at key off and compared to previously stored locations. Locations that are frequently visited may be flagged as being base or learned locations and provided with a tag or label. The vehicle controller 103 may also learn according the manual tagging activities of the user.

At operation 604, the vehicle controller 103 may execute instructions to predict a destination for the next trip. For example, this operation may be performed at key on. The system 100 may refer to previous location data to predict the next destination. The vehicle controller 103 may provide one or more predicted destinations. A variety of algorithms may be available to predict destinations as described previously herein.

At operation 606, the vehicle controller 103 may execute instructions to generate tag phrases for the predicted destinations. The vehicle controller 103 may implement one or more machine learning algorithms to generate the tag phrases as described previously herein. Each destination may have one or more associated tag phrases. A list of tag phrases may be generated.

At operation 608, the vehicle controller 103 may execute instructions to sort or order the tag phrases. Ordering the tag phrases may include sorting the tag phrases in an order of highest relevance or priority such that the most relevant tag phrases are displayed in an earlier position of a list. Tag phrases may be ordered by the relative frequency of words, categories and/or word sequences included in previously-selected tag phrases selected by the user. For example, tag phrases that include words or categories that occur with higher relative frequency may be assigned a higher priority in the list. Each of the machine learning algorithms may be characterized by an associated weighting factor. The weighting factor may represent the relative confidence level in the outputs of the algorithms. For example, algorithms that have previously generated tag phrases that are selected by the user or that are closest to those input by the user may have a higher weighting factor. The tag phrases may be ordered such that the tag phrase with the greatest probability of being selected is at the top of the list. Ordering may include applying the weighting factors associated with machine learning algorithms. The vehicle controller 103 may monitor the tag phrases that have been previously selected by the user. Tag phrases that have not been selected by the user may be assigned a lower position in the list (e.g., lower priority). The vehicle controller 103 may order the tag phrases for display based on relative frequencies of the words and word sequences included in previously-selected tag phrases such that tag phrases including words and word sequences having greater relative frequency are displayed earlier. Tag phrases having greater relevance may be displayed in earlier positions of the list.

The learning, generating, and ordering operations may access the database of previously stored location and learning data. The retrieval may be from a locally stored database 210 and/or from a remotely stored database 214. The operations described may be implemented on a number of devices that are accessing the database. For example, the vehicle controller 103 may access onboard database 210. As another example, the remote device 216 may access the remote database 214 and perform similar operations. The remote device 216 may be configured to learn tag phrases for locations according to a composition of existing tag phrases using words and word sequences learned from prior selections and inputs of a user and store the locations and associated tag phrases in the remote database 214 in a manner similar to the vehicle controller 103.

At operation 610, instructions may be executed to output or communicate the tag phrase or phrases to the user. For example, the vehicle controller 103 may output tag phrases to the user interface 104 for display in a list. In another example, the vehicle controller 103 may output the tag phrases as spoken language via the speaker 113. At operation 612, instructions may be executed to receive user input regarding the selected tag phrase. User input may be via a touchscreen display, a button, and/or voice recognition. The user inputs may include voice inputs that may be converted to a sequence of words At operation 614, instructions may be executed to learn tag phrases for the locations or destinations. The machine learning algorithm may be updated with the user input. Words and categories associated with the selected tag phrase may receive higher weighting factors for future iterations. The machine learning tables may be updated with the latest selection data. Relative frequencies associated with categories and words from the user selection may be updated. In addition, relative frequencies associated with the selected word and phrases may be increased to reflect the selections. The vehicle controller 103 may store information as to whether a particular tag phrase was displayed and not selected. Tag phrases that are selected may increase in relative weight to increase the probability of being displayed in subsequent events. Tag phrases that have been displayed but not selected may decrease in relative weight so that tag phrases that have not been displayed may have a greater chance of being displayed in a subsequent event. The vehicle controller 103 may generate the tag phrases for the location such that the tag phrases have a greater probability of including words and word sequences used in previous user inputs (e.g., voice inputs, entered data).

At operation 616, the vehicle controller 103 may execute instructions to store the tag phrases and locations. Tag phrase information may be stored in the onboard database 210. In addition, the onboard database 210 may be updated with the relative frequencies of the words and categories used in the machine learning algorithm. The vehicle controller 103 may also store associated weighting factors for later use. The onboard database 210 may be on a local storage device. In addition, the remote server 212 may store a copy as a remote database 214 so that multiple devices associated with the user may access the remote database 214. Storing the tag phrases and location may also include copying the local onboard database 210 to remote database 214.

At operation 618, the vehicle controller 103 may execute instructions to provide trip assistance. For example, the vehicle controller 103 may generate a route to the selected destination or may suggest an alternate route to the predicted destination. In addition, other navigation and trip assistance functions may be performed. The vehicle controller 103 may further provide route guidance to the destination.

The system improves the expression of locations and predicted destinations to users. Locations may be expressed as phrases that mirror how the user expressed locations. Locations may be expressed as being relative to known or frequently visited locations. The system provides a more natural way of inputting locations and destinations and more naturally reflects how a user refers to locations. An additional benefit of the system is that the phrases are available across devices and applications associated with the user. This allows the same phrases to describe locations on any device such as vehicles, phones, tablets, and computers. Learning of phrases associated with the locations may take place on all devices which may improve the rate of learning.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a display programmed to output information to a user;
   an input device programmed to receive a user input;
   a positioning controller configured to communicate with a satellite; and
   a controller programmed to
      generate one or more tag phrases that express a relationship between a destination and a learned location tag and are based on words and word sequences learned from prior selections and inputs of a user,
      calculate a priority value for the one or more tag phrases using a relevancy between the tag phrases and the locations, and a weight of the words and word sequences of each tag phrase previously being selected by the user, wherein the tag phrases with more frequently selected words or word sequences are assigned with higher weight for the priority value calculation,
      responsive to arriving at the destination, communicate the tag phrases to the user via the display in an order such that tag phrases with higher priority values are presented at earlier positions on the display,
      responsive to receiving the user input indicative of an intent to select one or more of the tag phrases, associate the selected tag phrases with the destination, and
      provide trip assistance based on the selected tag phrases associated with the destination by the user using data received from the satellite via the positioning controller.

2. The vehicle of claim 1 wherein the learned location tag is a label associated with a previously learned and identified location.

3. The vehicle of claim 1 wherein the tag phrases express a relative positional relationship between a location associated with the destination and a location associated with the learned location tag.

4. The vehicle of claim 1 wherein inputs of the user include voice inputs that are converted to a sequence of words and the controller is further programmed to generate the tag phrases for the destination such that the tag phrases have a greater probability of including words and word sequences used in the voice inputs.

5. The vehicle of claim 1 wherein the tag phrases include one or more of a preposition, a label, a name of a person, the learned location tag, an activity type, a symbol, and relevant location tags that collectively describe the destination according to learned preferences of the user.

6. The vehicle of claim 1 wherein the controller is further programmed to maintain the destination and tag phrases in a remote database that is accessible via a network by applications executed on other devices associated with the user such that the applications identify the destination with the tag phrases generated by the controller.

7. The vehicle of claim 1 wherein the controller is further programmed to receive tagging data aggregated from other users and to generate the tag phrases based on the tagging data.

8. The vehicle of claim 1 wherein the controller is further programmed to communicate the tag phrases via a display.

9. A method comprising:
   identifying a location with a plurality of tag phrases that express a relationship between the location and a base location tag, wherein the tag phrases are generated based on words and word sequences learned from prior selections and inputs of the user, and at least one of the tag phrases includes an icon indicative of a type of business of the location;
   calculating a priority value for each of the tag phrases according to relevancy between the tag phrases and the locations, and a weight of the words and word sequences of each tag phrase previously being selected by the user, wherein the tag phrases with more frequently selected words or word sequences are assigned with higher weight for the priority value calculation;
   communicating the tag phrases to the user using the priority value such that tag phrases with a higher priority value are presented earlier;
   responsive to receiving input from the user to select one of the tag phrases, associating the selected tag phrase with the destination; and
   providing trip assistance based on the selected tag phrase associated with the destination.

10. The method of claim 9 further comprising converting voice inputs into a sequence of words and ordering the tag phrases for the location such that such that the tag phrases have a greater probability of including words and word sequences used in the voice inputs.

11. The method of claim 9 further comprising maintaining the tag phrases in a database that is accessible via a network.

12. The method of claim 11 further comprising accessing the database from applications executed on more than one device and presenting location information in the applications using the tag phrases from the database such that the location is identified with the same tag phrases in each of the applications.

13. The method of claim 11 further comprising receiving tag data from a server connected to the network and constructing at least one of the tag phrases according to the tag data.

14. The method of claim 9 further comprising ordering the tag phrases for communication to the user by assigning a higher priority to tag phrases that include words and word sequences having a greater relative frequency of occurrence in prior selections and user inputs.

15. A system comprising:
   a database;
   a first controller programmed to
      identify locations with tag phrases expressing a relationship between the locations and a base location tag, and learned according to words and word sequences learned from prior selections and inputs of a user,
      determine a relevancy between the one or more tag phrases and the destination;
      calculate a priority value to the tag phrases using the relevancy and a weight of the words and word sequences of each tag phrase previously being selected or input by the user, wherein the tag phrases with more frequently selected or input words or word sequences are assigned with higher weight for the priority value calculation,
      present the tag phrases to a user via an interface in an order such that tag phrases with higher priority values are presented at earlier positions on the display, and
      responsive to receiving a user input selecting one or more of the tag phrases, associate the location and the selected tag phrases, and store location and the selected tag phrases as associated in the database; and a second controller having access to the database and programmed to identify locations using the tag phrases from the database.

16. The system of claim 15 wherein the second controller is further programmed to learn tag phrases for locations according to a composition of existing tag phrases using words and word sequences learned from prior selections and inputs of a user and store the locations and associated tag phrases in the database.

17. The system of claim 15 wherein the tag phrases include one or more of a preposition, a symbol associated with the locations, a category label associated with the locations, a name of a person associated with the locations or the base location tag, and a proper name associated with the locations.

18. The system of claim 15 wherein the second controller is programmed to execute a plurality of applications and wherein the applications are programmed to identify a location using the tag phrases from the database such that each of the applications identifies the location with a same tag phrase.

\* \* \* \* \*